(12) United States Patent
Mace et al.

(10) Patent No.: US 10,769,128 B2
(45) Date of Patent: Sep. 8, 2020

(54) DELEGATED KEY-LEVEL LOCKING FOR A TRANSACTIONAL MULTI-VERSION KEY-VALUE STORE

(71) Applicant: salesforce.com, inc., San Francisco, CA (US)

(72) Inventors: James E. Mace, San Francisco, CA (US); Jameison Bear Martin, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 275 days.

(21) Appl. No.: 15/420,255

(22) Filed: Jan. 31, 2017

(65) Prior Publication Data

US 2018/0218022 A1  Aug. 2, 2018

(51) Int. Cl.
*G06F 16/23* (2019.01)
*G06F 16/28* (2019.01)

(52) U.S. Cl.
CPC .......... *G06F 16/2343* (2019.01); *G06F 16/28* (2019.01)

(58) Field of Classification Search
CPC ..................... G06F 17/30362; G06F 17/30377
See application file for complete search history.

(56) References Cited

U.S. PATENT DOCUMENTS

| | | | |
|---|---|---|---|
| 5,551,046 A | 8/1996 | Mohan et al. | |
| 5,778,388 A * | 7/1998 | Kawamura | G06F 11/1466 |
| 5,940,828 A * | 8/1999 | Anaya | G06F 9/52 |
| 6,606,626 B1 | 8/2003 | Ponnekanti | |
| 2012/0271803 A1* | 10/2012 | Ferguson | G06F 17/30575 707/703 |
| 2013/0262423 A1* | 10/2013 | Graefe | G06F 17/30362 707/703 |
| 2014/0379679 A1* | 12/2014 | Kohno | G06Q 40/02 707/704 |
| 2016/0132364 A1* | 5/2016 | Huang | G06F 9/466 710/200 |
| 2016/0232178 A1* | 8/2016 | Little | G06F 11/3476 |
| 2016/0314159 A1* | 10/2016 | Liang | G06F 17/30557 |

OTHER PUBLICATIONS

"A Scalable Lock Manager for Multicores," Hyungsoo Jung, et al., SIGMOD'13, Jun. 22-27, 2013, New York, New York, USA., 12 pages.
"Shore-MT: A Scalable Storage Manager for the Multicore Era," Ryan Johson, et al., EDBT'09, Mar. 24-26, 2009, Saint Petersburg, Russia, pp. 24-35.

* cited by examiner

*Primary Examiner* — Hosain T Alam
*Assistant Examiner* — Anthony G Gemignani
(74) *Attorney, Agent, or Firm* — Kowert, Hood, Munyon, Rankin & Goetzel, P.C.; Lawrence J. Merkel (57) ABSTRACT

This disclosure provides various techniques that may allow for key-level lock requests in a database to be managed by code that manages a memory buffer for the database. The transaction-level locks and other higher level locks may be managed by a separate lock manager. In an embodiment, the code inserts key-level lock requests in the record chain even if there is a conflict, and the key-level lock requests remain in the chain after the locks are subsequently granted. Preemption may also be supported in the record chain, in some embodiments.

11 Claims, 7 Drawing Sheets

DELEGATED KEY-LEVEL LOCKING FOR A TRANSACTIONAL MULTI-VERSION KEY-VALUE STORE

BACKGROUND

Technical Field

This disclosure relates to the key-level locking in databases.

Description of the Related Art

Various forms of databases are a common organized data storage used for large data sets in computers. The database can be queried with various keys, values of the keys, etc. in order to access data in the database. Multiple requestors can be making accesses to the database. A series of accesses, processing of the accessed data, and updates of at least some of the data are often performed by a given requester. The series is referred to as a transaction, and is typically required to be atomic. That is, other transactions appear to occur either before or after the transaction, even though the actual database accesses can overlap.

A mechanism often employed to help ensure atomicity of transactions are locks on database entries. The locks can exist at various levels, from a transaction-level lock to a key-level lock. The keys in a key-value store are the values that uniquely identify each record in the data base. Thus a key-level lock may be a lock on one record of the database (e.g. one row). Transactions can include many key-level locks, presenting difficulties for managing the key-level locks in a lock manager that handles all locks for transactions. Such lock managers often do not scale well and experience performance problems as the number of outstanding transactions increases.

DETAILED DESCRIPTION

In an embodiment, a memory buffer is used to accumulate record updates for a database. The memory buffer may include a hash table that may be indexed by a hashed key, where the key uniquely identifies a record in the database. For each hashed key entry, there may be a record chain that is updated with key-value pairs corresponding to various transactions performed by database requestors. The order of updates in the chain may be the order that the updates are performed to the database, as established both the by temporal order of requests and, in the case of temporally close requests, by conflict detection and resolution in a buffer controller that controls the buffer.

More particularly, the buffer controller may be configured to receive key-level lock requests. The key-level lock requests may be requests for a lock on a particular key. Viewed in another way, a key-level lock request may be a lock request for a row that corresponds to a given key. Higher level lock requests that affect multiple rows, entire database tables, entire transactions, etc. may be managed by a separate lock manager, in an embodiment. For example, a higher level lock may include a lock representing the execution state of a transaction (i.e., a transaction lock). Other types of higher level locks may include, e.g., locks on database relations or users. In one embodiment, each active transaction may have an associated transaction lock that is held in exclusive state by the process executing the transaction. Other transactions may await its completion by requesting a shared lock on the transaction lock. They will be awoken when the lock owner releases its transaction lock due to commit or rollback, or when a notification request is issued on the lock. The delegation of higher level lock requests to the lock manager while key-level lock requests are managed by the buffer controller may, in some embodiments, improve the scalability of the lock manager to more database requestors. There may be many key-level locks in a transaction, but fewer higher level locks. Additionally, the logic for detecting timeouts, performing rollbacks, etc. may be part of the lock manager and key-level lock requests and releases may be separately handled by the buffer controller.

Key-level lock requests may be explicit lock requests transmitted by clients to the buffer controller. Additionally, key-level lock requests may be an implicit part of a read or write request transmitted by clients to the buffer controller. A write request may include a key-value pair (i.e. the key identifying the row to be updated and the value to be written to the row). Each lock request may have an attribute which may be used in conflict resolution among multiple lock requests for a given key. This attribute may variously be referred to herein as a lock type, or a lock strength. A higher lock strength permits less access/lockability for other transactions subsequent to the grant of the lock having the higher level lock strength. For example, a lock strength of exclusive may be provided for a write operation, because it is changing the value associated with the key. A lock strength of shared may be used for a transaction that reads the row associated with the key and the transaction would be affected if the value associated with the key is changed. Generally, any set of lock strengths may be defined and the conflict resolution between them may be defined based on the lock strengths.

It should be noted that various elements of this disclosure that are shown in the figures or described in the text may be used in conjunction with any of the computer systems, servers, mobile devices, other apparatuses, elements, or components disclosed herein or known in the art, among other systems. In various embodiments, some of the elements of process flows shown may be performed concurrently instead of sequentially, or in a different order than shown, or may even be omitted altogether in some cases. Additional process flow elements that are not shown may also be performed as appropriate or desired. In some embodiments, different elements of process flows may be performed by the same system or different systems.

One of ordinary skill in the art with the benefit of this disclosure will understand that various types of database or other storage technologies may be used in accordance with this disclosure. One of ordinary skill in the art with the benefit of this disclosure will also understand that the teachings herein are applicable to various types of situations in which key-level locking is part of the overall function of the database when multiple transactions may be presented to the database.

Figure 1:
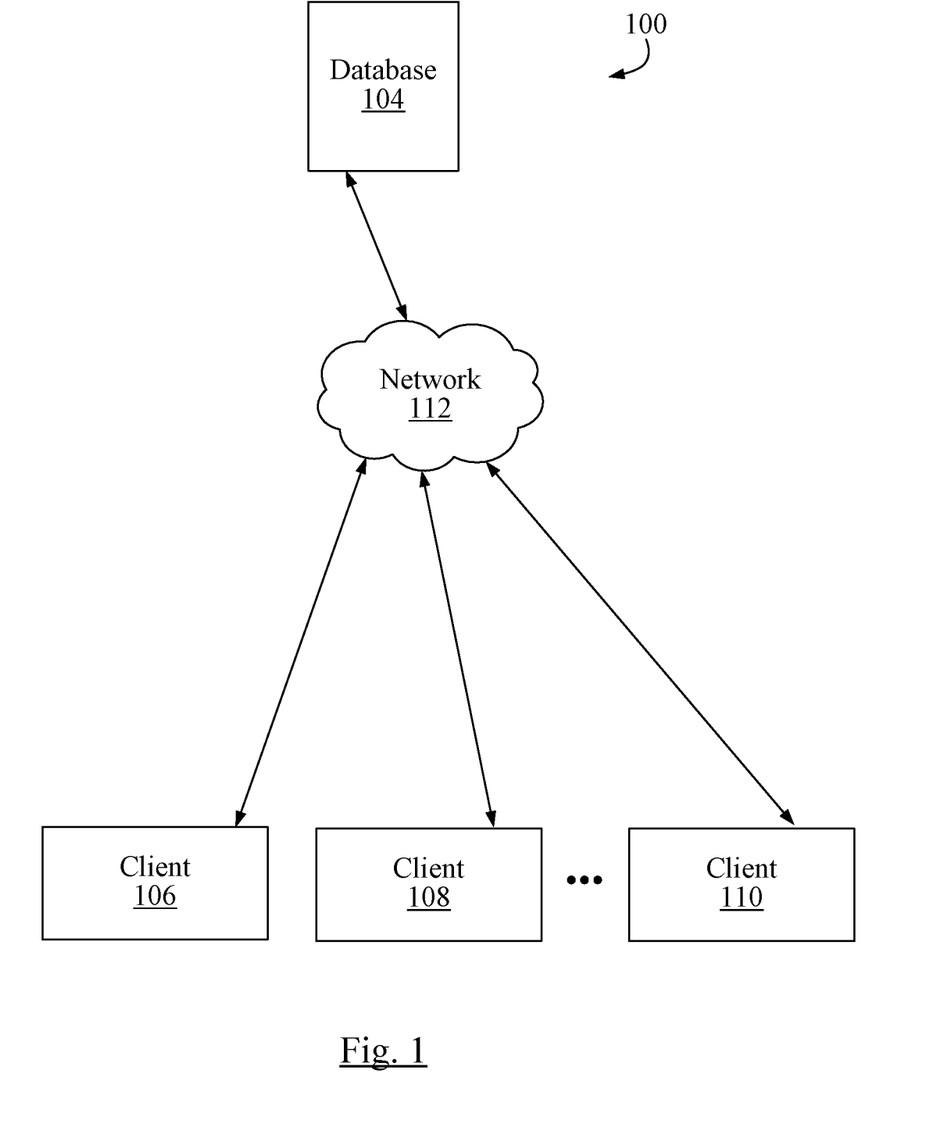
FIG. 1 is a block diagram illustrating an embodiment of a database and various database clients.

Turning now to FIG. 1, a block diagram of a system 100 is shown. In the system 100, a network 112 may represent the Internet, an intranet, or any other suitable type of computer network. The network 112 may couple a database server 104 to one or more clients 106, 108, 110.

In some embodiments, the database server 104 may be embodied in one or more physical computer system(s). Various types of data may be stored on database server 104, as discussed in more detail below. The database server 104 may be, in some embodiments, a cloud-based system providing software operation for users on clients 106, 108, and/or 110. For example, the database server 104 may be part of a software as a service (SaaS) model. Alternatively, the database server 104 may be directly operated by a user.

The clients 106, 108, and 110 may each include one or more computer systems. Each client 106, 108, and 110 may be a database requestor, and may be configured to issue database queries to the database server 104. Multiple queries and other database accesses from a client 106, 108, or 110 may form a transaction. The components of the transaction either complete successfully as a unit on consistent data from underlying database entries, or is rolled back and retried if the data changes due to interference from a different transaction. Generally, when two transactions conflict, the database server 104 may select a transaction to roll back and may permit the other transaction to commit, finalizing its changes to the database. Rolling back a transaction may refer to removing any changes the transaction attempted to make to the database. The transaction may be reattempted from the start, or abandoned, at the discretion of the database requestor.

Figure 2:
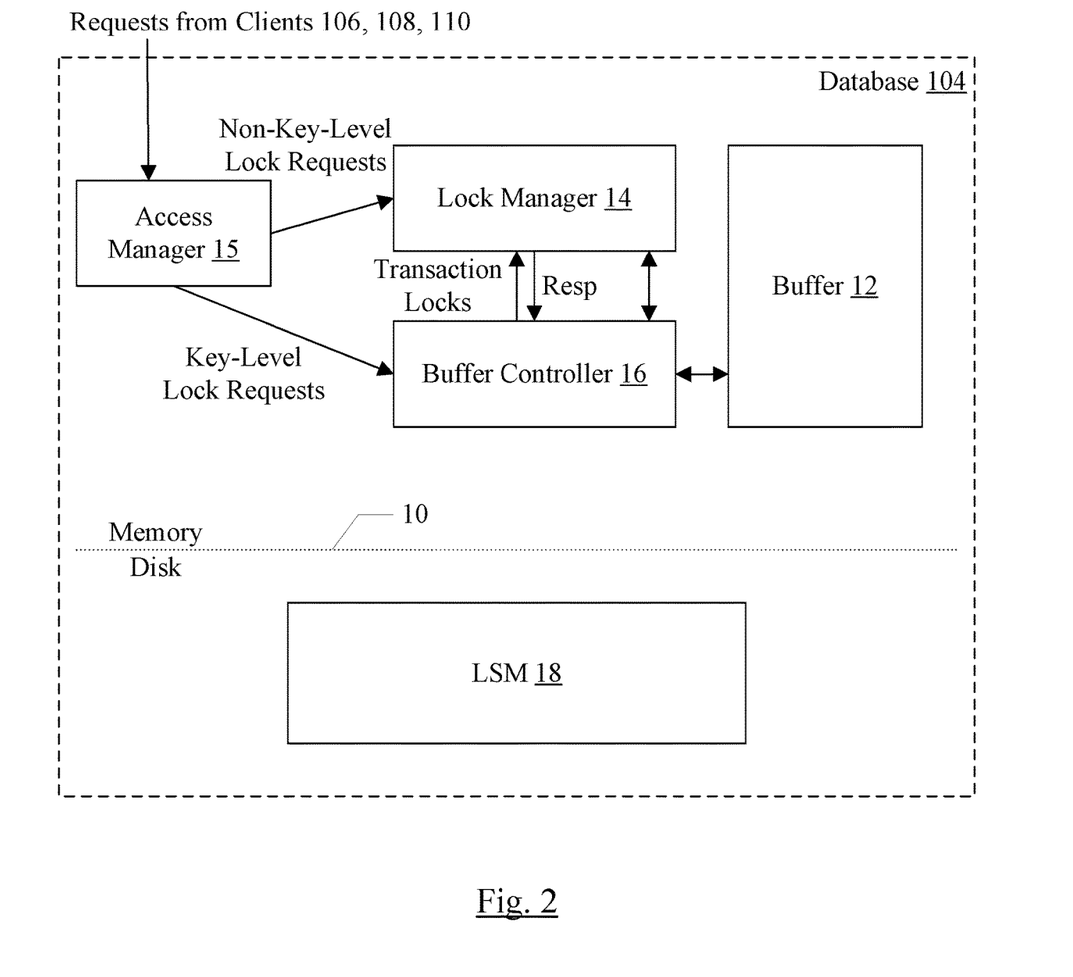
FIG. 2 is a block diagram of one embodiment of the database.

FIG. 2 is a block diagram of a portion of one embodiment of the database server 104 illustrated in greater detail. In the illustrated embodiment, the database 104 includes a portion in memory (above dotted line 10) and a portion on non-volatile storage (e.g. disk, below dotted line 10). The memory portion includes a buffer 12, lock manager code 14, access manager code 15, and buffer controller code 16. The lock manager code 14 may be more briefly referred to herein as the lock manager 14; the access manager code 15 may be more briefly referred to herein as the access manager 15; and the buffer controller code 16 may be more briefly referred to as the buffer controller 16. The code may include instructions which, when executed on a processor in the database server 104, cause the operations described herein for the code. The access manager 15 may be configured to receive various database requests from the clients 106, 108, and 110. The requests may be part of a transaction be handled by the clients 106, 108, and 110, or each request may be a transaction managed by the lock manager 14.

Figure 3:
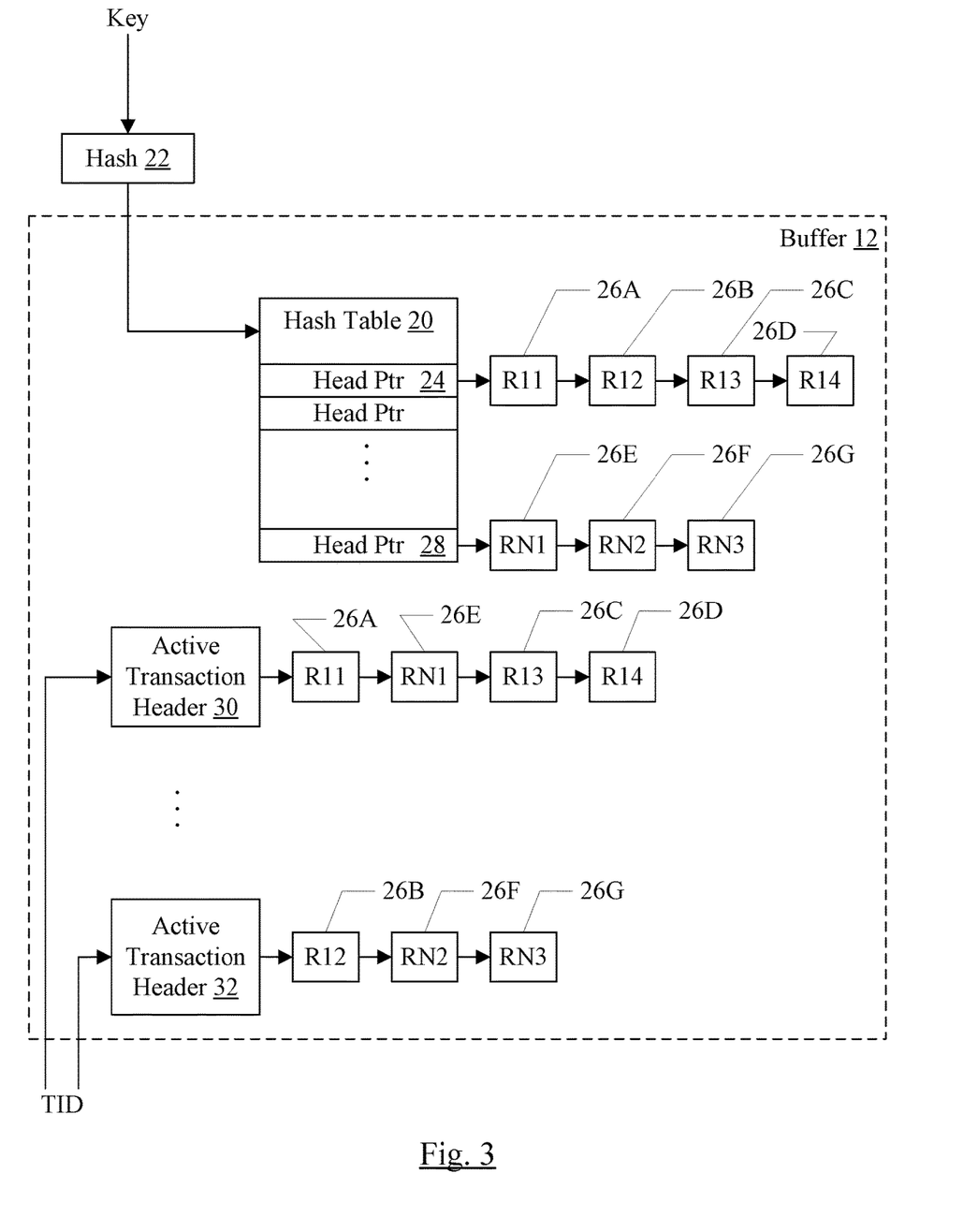
FIG. 3 is a block diagram of one embodiment of a buffer shown in FIG. 2.

In response to the requests from the clients 106, 108, and 110, the access manager 15 may generate various key-level lock requests, and may transmit the requests to the buffer controller 16. The buffer controller 16 may be configured to manage the key-level lock requests, using the buffer 12 to store the record chains including the locks and lock requests for each key. The buffer controller 16 may detect conflicts in the key-level lock requests for a given key, and resolve the conflicts based in part on the lock strength associated with each request. The buffer controller 16 may be configured to return a response. If no conflict is detected, a lock grant may be transmitted as the response without delay. If a conflict is detected, the response may be delayed until the conflict may be resolved. In such cases, the buffer controller 16 may be configured to generate blocking transaction lock requests to the lock manager 14 for the conflicting key locks. The lock manager 14 may return a response when the conflicting transaction commits, there is a timeout, the transaction is rolled back, etc. The buffer controller 16 may re-evaluate the lock request based on the response and the state of the record chain, and may grant the lock or delay again if another conflict is detected. Additional details of the buffer 12 are illustrated in FIG. 3 and described in further detail below. The access manager 15 may also generate non-key-level lock requests for the lock manager 14.

The buffer controller 16 may delegate the responsibility for waiting on row locks, determining rollback, determining deadlock, making transaction-level decisions, etc. to the lock manager 14. Thus, the management of key locks may be time and space efficient, in some embodiments.

The disk portion of the database server 104 may store a log structured merge tree (LSM) 18 storing the database data (keys and values). The LSM 18 is a data structure that is becoming more frequently used for large key-value databases, because LSM structures may be managed using bulk file operations (e.g., merging of large files) rather than the fine-grained page/block level operations employed with traditional databases data structures. In order to accumulate enough data for the bulk file operations, key/value pairs may be captured in the buffer 12. Other embodiments may use other structures than an LSM to store database data on the non-volatile storage (e.g. disk or solid state memory).

FIG. 3 is a block diagram of one embodiment of the buffer 12. In an embodiment, the buffer 12 may include a hash table 20, the entries of which include linked lists of records representing versioned key/value pairs. The order of records on each linked list may reflect the order of insertion, with the most recently inserted record versions being located nearest the head of the list. A hash function applied to the key, illustrated as hash 22 in FIG. 3, may be used to map keys to hash table entries. The hash function may be part of the buffer controller 16, but is shown in FIG. 3 for clarity. Any hash function may be used. If the key space is known to be small, the hash may be an identify function in which each key is simply mapped to a corresponding entry. Other embodiments may implement any hash to reduce the possible keys to a mapping to entries in the hash table 20. Larger hash tables may reduce the likelihood that multiple keys hash to the same entry.

As illustrated in FIG. 3, the hash table 20 may include a head pointer pointing to the head of the record chain for the corresponding key. The records in the record chain may be sorted in order of insertion, and thus represent the update of the key-value pair in the record over various transactions, ordered as the transactions were ordered when they occurred. That is, the record chain may record the history of updates from the value stored in the LSM 18 (which would be the current value if the record chain corresponding to the key is empty) through the most recently updated key-value pair. Viewed in another way, the records are versioned key-value pairs. For example, the head pointer 24 points to a linked list of versions 26A-26D of a key-value pair that maps to the entry storing the head pointer 24 in the hash table 20. The most recent record R11 26A is pointed to by the head pointer; the next most recent record R12 26B is pointed to by record 26A; the most recent after record R12 26B is record R13 26C pointed to by record 26B; and finally record R14 26D is pointed to by record 26C. The number of records may be more or fewer than those shown may vary over time. Similarly, the number of records at a given point in time may vary from record chain to record chain. For example, head pointer 28 points to a list of 3 records RN1 26E, RN2 26F, and RN3 26G.

While linked lists are shown as the record chain data structure in FIG. 3, other embodiments may implement any data structure which may store records in an ordered fashion and that may be traversed rapidly to find an entry. In an embodiment, the hash table may permit constant-time lookup (probing) by key. The records in the hash table may be indexed by a skip list which permits iteration over the keys in sorted order via forward and reverse scans, in some embodiments.

Records 26A-26G from the hash table 20 may also be linked onto lists representing active transactions in the system. For example, active transaction headers 30 and 32 may correspond to active transactions initiated by clients 106, 108, and/or 110. Each transaction header may store data corresponding to the transaction (e.g. a transaction ID, or TID, identifying the transaction and used to locate the transaction when being updated), a transaction commit number when committed, information identifying the requestor, etc. The active transaction headers 30 may also each store a head pointer to the list of records updated by the transaction. The head pointer may point to the most recently added record for the transaction. Records within a transaction may be identified by a transaction sequence number, which allows the system to roll back transactions by removing records from the list tail.

Thus, in FIG. 3, the transaction corresponding to the active transaction header 30 may include the records 26A, 26E, 26C, and 26D. The transaction corresponding to the active transaction header 32 may include records 26B, 26F, and 26G. Thus, a given transaction may include records corresponding to multiple keys and/or multiple versions of a given key-value pair.

As mentioned previously, each record may include an indication of its lock strength (shared, exclusive, etc.). When a new record is to be inserted into the record chain (in response to an operation in a given transaction), the buffer controller 16 may scan the record chain for that key determine whether there is a conflict. If there is a conflict, the transaction performing the insertion may blocked until the lock may be granted following commit or rollback of the transaction holding the conflicting lock.

When a transaction commits, the corresponding transaction header may be atomically updated with a transaction commit number (XCN). The linked list of records for the transaction is then traversed and the individual records may be stamped with the XCN.

Once a sufficient amount of data has accumulated, or when explicitly requested by higher level software such as the lock manager 14 or other code (not shown), records for committed transactions may be flushed to disk (i.e. the LSM 18, in the illustrated embodiments. The flushed records may be output in key and version sorted order. Once recorded on disk, the records may be purged from the buffer 12.

In an embodiment, an asynchronous (to the buffer controller 16) background process may responsible for defragmenting the buffer 12 as records are inserted and removed. In an embodiment, additional asynchronous background processes may flush the records to disk and purge records from the buffer 12.

Figure 4:
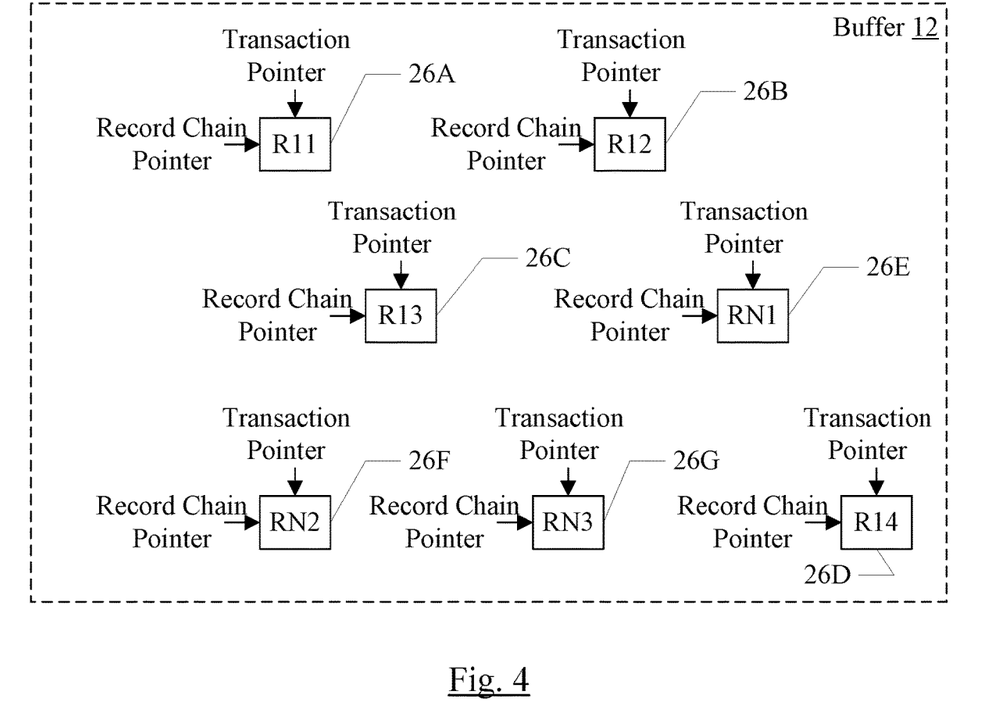
FIG. 4 is a block diagram illustrating one embodiment of various records stored in memory.

FIG. 4 is a block diagram of another embodiment of the buffer 12, illustrating that each record 26A-26G may be stored in one location in the buffer 12. Multiple pointers from different structures (e.g. a transaction pointer corresponding to an active transaction and a record chain pointer corresponding to a record chain from the hash table 20) may point to the record in 26A-26G.

In an embodiment, a record may be allocated in the buffer 12 in response to a key-level lock request. The memory location allocated to the request may be the memory location used throughout the life of the record in the buffer 12 (except in the case of defragmentation of the buffer 12). That is, even if the lock request is not granted immediately (e.g. due to a conflict), it may be linked into the record chain for the key and placed in a "pending" state (described in more detail below). Thus, key-level lock requests may use the record chain as a waiting queue, which may be more efficient than using a separate data structure for this purpose. The record may remain in the same memory location in memory, and the same position in the record chain (except for preemptions, discussed in more detail below, or roll backs).

Figure 5:
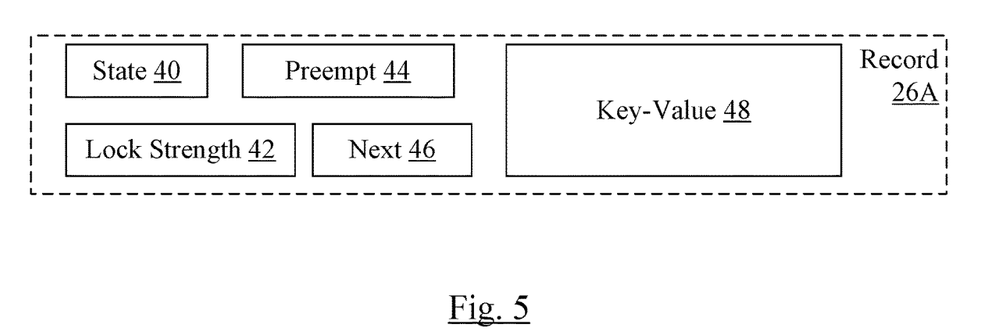
FIG. 5 is a block diagram of one embodiment of a record.

FIG. 5 is a block diagram illustrating one embodiment of the record 26A. Other records 26B-26G may be similar. In the illustrated embodiment, the record 26A includes a state field 40, a lock strength field 42, a preempt count field 44, a next pointer field 46, and a key-value pair field 48. Other embodiments may include additional fields, alternative fields, and/or any subset of the fields shown in FIG. 5 and additional fields as desired.

The state field 40 may store a state of the entry. The state may be one of multiple possible states. For example, in an embodiment, the possible states may include a pending state as mentioned above. In the pending state, the key-value pair field 48 stores the key-value pair corresponding to the record 26A, but the lock indicated by the lock strength field 42 has not been granted (e.g. due to a conflict with another record in the record chain). The possible states may also include a granted state, in which the lock indicated by the lock strength field 42 has been granted and is still being held. The possible states may further include a committed state indicating that the transaction corresponding to the record 26A is committed and thus the lock is no longer held, but the key-value pair awaits transfer to the LSM 18.

The lock strength field 42 stores the strength of the lock held by the record 26A. The possible lock strengths may vary from embodiment to embodiment. In an embodiment, the possible lock strengths include the shared and exclusive states mentioned above. The possible lock strengths may also include a no lock strength, indicating that the record does not hold a lock.

The preempt count field 44 may be included in embodiments in which preemption is included. In an embodiment, an exclusive lock that has a state of pending (not granted due to earlier conflict) may be preempted by a subsequently-received lock request for a shared lock. Preempting the pending exclusive lock may permit improved performance, in some embodiments, since shared locks may be granted in parallel to multiple transactions and thus the transactions may proceed in parallel. However, it is possible to cause starvation for the pending exclusive lock if too many shared locks are permitted to preempt the exclusive lock. The preemption count field 44 may be updated at each preemption to increase the count, and the count may be compared to a threshold. If the preemption count exceeds the threshold, further preemptions may not be permitted so that the exclusive lock may be granted in a reasonably timely fashion (assuming no deadlocks or transaction roll backs for the transaction requesting the exclusive lock).

The next pointer field 46 may store the pointer to the next record in the record chain with the record 26A. In some embodiments, the record chain may support forward and reverse scanning of the chain and the next pointer field 46 may store two pointers, a first pointer to the next record in the record chain and a second pointer to the previous record in the record chain. The next pointer field 46 may also store a pointer for the next record in a transaction chain (and a second pointer to the previous record in the transaction chain if forward and reverse scanning is supported).

The key-value pair field 48 may store the key-value pair for the record 26A. Some embodiments may support lock-only requests and in such cases, a lock-only record 26A may include a key but no corresponding value. In some embodiments, the key is implicit in the record chain to which the record 26A is attached, and the key-value pair field 46 may store only the value.

It is noted that various other fields may be included in the record 26A for various other purposes not described in detail herein. Additional lock strengths, states, preemption states, etc. may be supported in various embodiments as well.

Figure 6:
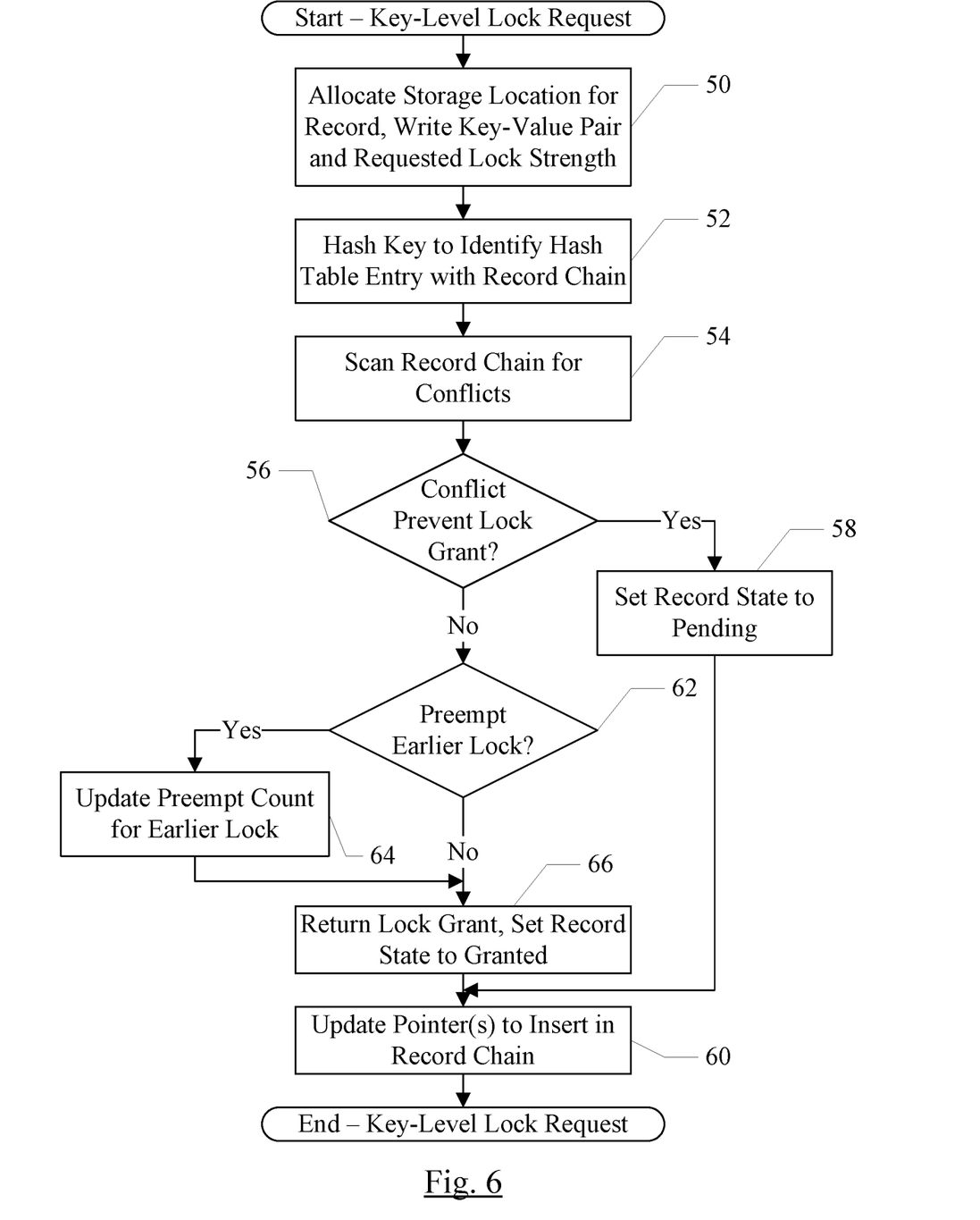
FIG. 6 is a flowchart illustrating operation of one embodiment in response to a key-level lock request.

FIG. 6 is a flowchart illustrating one embodiment of certain techniques described herein. More particularly, the flowchart shown in FIG. 6 may illustrate certain activities that may be performed by the buffer controller 16 in response to receiving a key-level lock request. While the blocks are shown in a particular order for ease of understanding, other orders may be used. Blocks, combinations of blocks, and/or the flowchart as a whole may be performed in parallel. The buffer controller 16 may be configured to implement the operation shown in FIG. 6. For example, the buffer controller 16 may include instructions which, when executed by a processor in a computer system, cause the computer system to perform the operations illustrated in FIG. 6.

The buffer controller 16 may allocate a storage location in the buffer 12 for a record to store the lock request/key-value pair (block 50). The buffer controller 16 may write the key-value pair to the record (field 48) and may write the requested lock strength as well (field 42). Any other state in the record (not shown in FIG. 5) may be updated or initialized as well. The buffer controller 16 may hash the key to identify the hash table entry corresponding to the key (block 52).

The buffer controller 16 may scan the record chain to identify conflicts for the lock request, if any (block 54). Various conflicts may exist depending on the lock strength of the request, the lock strength of preceding records in the record chain, state of the records in the record chain, and the definition of lock strengths for the database. For example, exclusive locks may conflict with earlier exclusive locks for uncommitted records, since the records may be rolled back if the corresponding transaction is rolled back. Shared locks may conflict with pending (not granted) lock requests if the preempt count in the pending lock request exceeds a threshold. It is noted that a threshold may be exceeded if the preempt count equals the threshold count value or is greater than the threshold count value, in an embodiment. Records in the record chain that are committed (e.g. the corresponding transaction has completed or reached a commit point subsequent to the generation of the record) may not have conflicts with lock requests, since the key-value pair 48 in these records is logically part of the database (e.g. logically include in the LSM 18) even though the records have not yet been flushed to the non-volatile data storage associated with the database.

In some embodiments, multiple keys may hash to the same hash table entry in the hash table 20. In such an embodiment, identifying conflicting records in the record chain may include checking a subset of the records in the record chain that include the same key in the key-value pair field 48. Alternatively, the hash table 20 may support multiple head pointers in the hash table entries, one for each different key that maps to the same entry in the hash table 20 and that has live records in the record chain.

If the scan of the record chain results in a conflict that prevents lock grant (decision block 56, "yes" leg), the buffer controller 16 may set the state field 40 in the record to pending (block 58). In some cases, the transaction that caused the pending lock request may be blocked. The determination of whether or not to block the transaction may be delegated to the lock manager 14, in an embodiment. For example, the lock manager 14 may time out the lock request and block the transaction until a subsequent return of the lock grant by the buffer controller 16 (or a second time out may be detected to roll back one of the transactions that may be in deadlock, to allow the other transaction to make forward progress/complete). The details of transaction roll back and deadlock detection may also be delegated to the lock manager 14.

The pointers in the record chain may be updated to insert the record in the record chain (block 60). For example, the head pointer in the hash table 20 may be updated to point to the record, and the former head pointer may be written to the next field 46 in the record. In cases in which a previous pointer is also included for reverse-scanning the linked list, the buffer controller 16 may update the record indicated by the previous head pointer to have its previous pointer indicating the newly-inserted record.

If the scan of the record chain does not result in a conflict that prevents lock grant (decision block 56, "no" leg), but the lock request preempts a pending earlier lock (i.e., a previously-received lock request in the pending state in the state field 40—decision block 62, "yes" leg), the buffer controller 16 may update the preempt count field 44 in the record corresponding to the pending earlier lock (e.g. incrementing the count, block 64). As mentioned previously, preemption may be performed if the preempt count of the pending earlier lock request does not exceed the threshold. Independent of the preemption update, the buffer controller 16 may return the lock grant to the access manager 15, which may communicate the grant to the corresponding client 106, 108, 110 that is performing the transaction, if appropriate. The buffer controller 16 may set the state field 40 for the newly-allocated record to granted (block 66). The pointers in the record chain may be updated (block 60). In the case of a preemption, the update of the pointers inserts the newly-allocated record in the record chain ahead of the preempted record. That is, instead of updating the head pointer to point to the newly-allocated record, the next pointer of the preempted record may be updated to point to the newly-allocated record (and the previously stored next pointer from the preempted record may be written to the next pointer field 46 of the newly-allocated record). Inserting a first record ahead of another record in the record chain may generally refer to inserting the first record such that it logically appears to have occurred prior to the second record in the order established by the record chain, even though the first record was temporally received after the second record.

Figure 7:
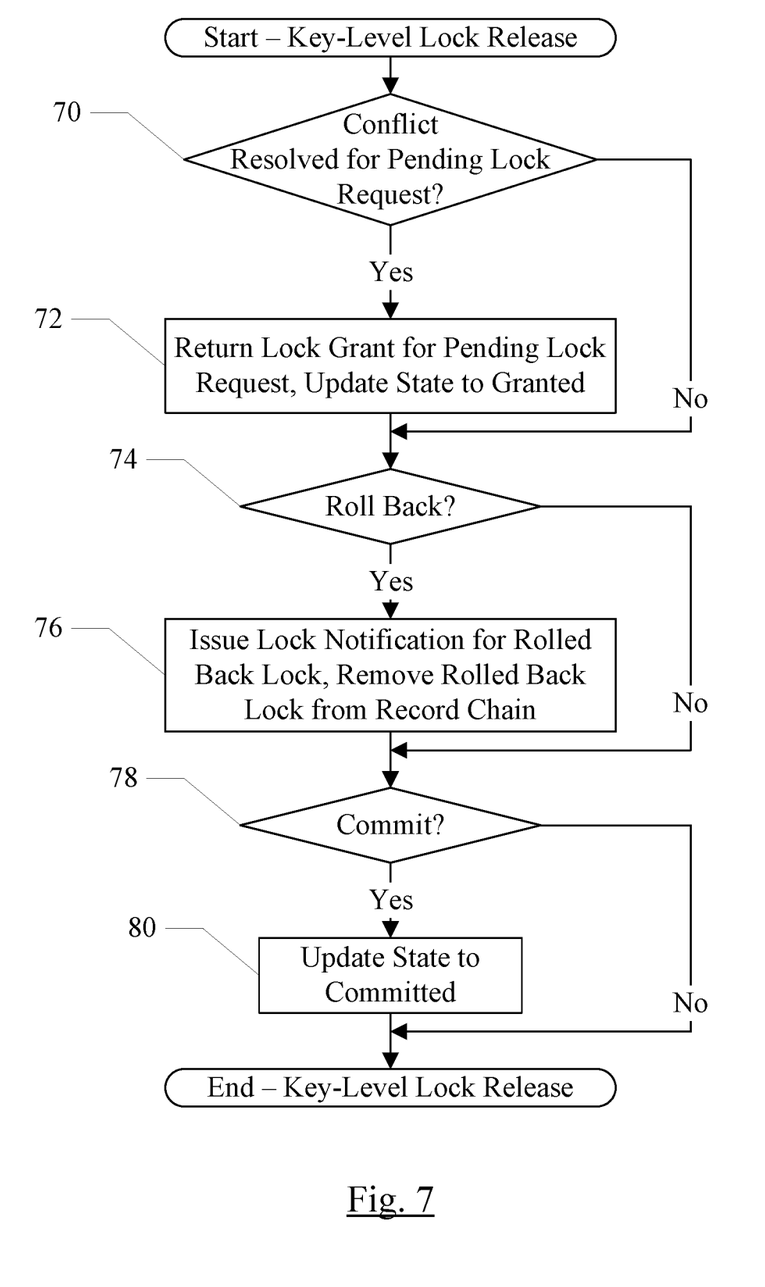
FIG. 7 is a flowchart illustrating operation of one embodiment in response to a key-level lock release.

FIG. 7 is a flowchart illustrating one embodiment of certain techniques described herein. More particularly, the flowchart shown in FIG. 7 may illustrate certain activities that may be performed by the buffer controller 16 in response to receiving a key-level lock release. While the blocks are shown in a particular order for ease of understanding, other orders may be used. Blocks, combinations of blocks, and/or the flowchart as a whole may be performed in parallel. The buffer controller 16 may be configured to implement the operation shown in FIG. 7. For example, the buffer controller 16 may include instructions which, when executed by a processor in a computer system, cause the computer system to perform the operations illustrated in FIG. 7.

A key-level lock release may be received by the buffer controller 16 in various ways. For example, if the lock manager 14 rolls back a transaction or partially rolls back a transaction, the lock manager 14 may transmit lock releases for the records that are being rolled back. Generally, rolling back a transaction refers to canceling the previous records created by the transaction to repeat the record generation after a conflict or deadlock with another transaction. Alternatively, a transaction may be cancelled to be restarted by the initiating client 106, 108, or 110 when the conflict/deadlock is detected and the uncommitted records may be released. When a transaction is committed, the locks for the transaction may be released as well. In some embodiments, when the buffer controller 16 places a lock request in pending state due to a conflict, the buffer controller 16 may place a lock request on a transaction lock held by the lock manager 14, and may reevaluate the pending lock request for conflicts when the transaction lock is released (indicating that the transaction is complete).

If the lock release resolves a conflict for a pending lock request (decision block 70, "yes" leg) and no additional conflicts are detected for the pending lock request, the buffer controller 16 may return a lock grant for the pending lock request (block 72). On the other hand, if the original conflict is resolved but another conflict is detected for the pending lock request, the buffer controller 16 may retain the lock request in the pending state (decision block 70, "no" leg) and may, in some embodiments, establish a lock request on the detected conflicting transaction.

If the lock release is part of a roll back (decision block 74, "yes" leg), the buffer controller 16 may issue a lock notification on the lock (block 76). Additionally, the buffer controller 16 may remove the record from the record chain as well. If the lock release is due to a commit (decision block 78, "yes" leg), the buffer controller 16 may update the state field 40 to committed (block 80). The record may then be eligible to be written to the LSM 18 (e.g. via a process performed by the buffer controller 16 periodically, not shown in FIG. 7).

Figure 8:
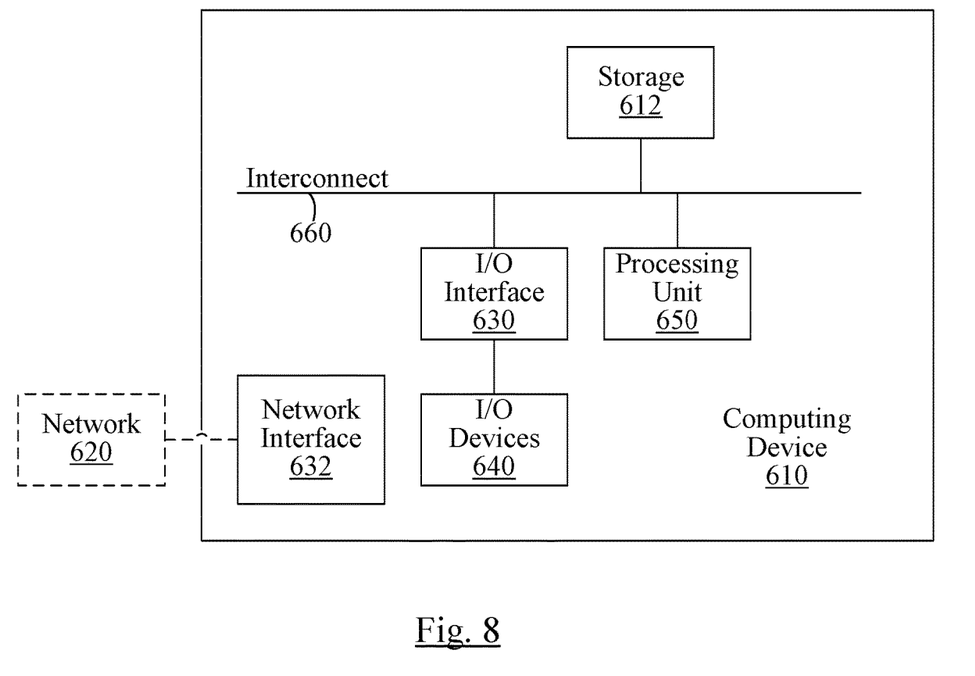
FIG. 8 is a block diagram illustrating a computing system, according to some embodiments.

Turning now to FIG. 8, a block diagram of a computing device (which may also be referred to as a computing system) 610 is depicted, according to some embodiments. Computing device 610 may be used to implement various portions of this disclosure. Computing device 610 is one example of a device that may be used as a mobile device, a server computing system, or any other computing system implementing portions of this disclosure. For example, computing device 610 may be a device that hosts the database server 104.

Computing device 610 may be any suitable type of device, including, but not limited to, a personal computer system, desktop computer, laptop or notebook computer, mobile phone, mainframe computer system, web server, workstation, or network computer. As shown, computing device 610 includes processing unit 650, storage subsystem 612, input/output (I/O) interface 630 coupled via interconnect 660 (e.g., a system bus). I/O interface 630 may be coupled to one or more I/O devices 640. Computing device 610 further includes network interface 632, which may be coupled to network 620 for communications with, for example, other computing devices. For example, the network 620 may be part of or all of the network 112 in FIG. 1.

The processing unit 650 may include one or more processors. In some embodiments, processing unit 650 includes one or more coprocessor units. In some embodiments, multiple instances of processing unit 650 may be coupled to interconnect 660. Processing unit 650 (or each processor within processing unit 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 612 may consist solely of volatile memory in some embodiments. Storage subsystem 612 may store program instructions executable by computing device 610 using processing unit 650, including program instructions executable to cause computing device 610 to implement the various techniques disclosed herein. Thus, the storage subsystem 612 may include a computer accessible storage medium storing instructions forming the lock manager 14 and/or the buffer controller 16, for example.

I/O interface 630 may represent one or more interfaces and may be any of various types of interfaces configured to couple to and communicate with other devices, according to various embodiments. In some embodiments, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"Based On." As used herein, this term is used to describe one or more factors that affect a determination. This term does not foreclose additional factors that may affect a determination. That is, a determination may be solely based on those factors or based only in part on those factors. Consider the phrase "determine A based on B." This phrase connotes that B is a factor that affects the determination of A, but it does not foreclose the determination of A from also being based on C. In other instances, A may be determined based solely on B.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Although specific embodiments have been described above, these embodiments are not intended to limit the scope of the present disclosure (even where only a single embodiment is described with respect to a particular feature). Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although some example embodiments are described as providing various advantages, any particular embodiment according to this disclosure may provide some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for managing a record chain associated with a key in a database managed by a database system comprising:
   receiving, in the database system, a key-level lock request for a transaction, the key-level lock request corresponding to a key in the database;
   allocating a memory location to store data associated with the key-level lock request;
   determining, by the database system, that a lock type associated with the key-level lock request is in conflict with at least one or more lock types associated with other records already in the record chain and associated with previously-received lock requests for the key that have been granted and that have not been completed;
   inserting the key-level lock request into the record chain prior to granting of the key-level lock request, wherein the key-level lock request waits in the record chain for the conflict to be resolved, and wherein inserting the key-level lock request into the record chain includes linking the memory location into the record chain;
   resolving at least one of the conflicts before granting the key-level lock request, wherein the at least one of the conflicts corresponds to a given previously-received lock request that is being completed;
   maintaining the key-level lock request in the record chain after granting the key-level lock request;
   maintaining the given previously-received lock request in the record chain after completing the given previously-received lock request;
   placing, by the database system, the key-level lock request in a pending state in the record chain in response to determining the conflict;
   receiving, in the database system, a second key-level lock request having a second lock type during a time that the key-level lock request is in the pending state;
   inserting, by the database system, the second key-level lock request in the record chain ahead of the key-level lock request responsive to the lock type and the second lock type;
   incrementing, by the database system, a count maintained with respect to the key-level lock request, wherein the incrementing is responsive to inserting the second key-level lock request ahead of the key-level lock request;
   receiving, in the database system, a third key-level lock request having a third lock type during the time that the key-level lock request is in the pending state;
   determining, by the database system, that the third key-level lock request would be inserted in the record chain ahead of the key-level lock request responsive to the lock type and the third lock type;
   determining, by the database system, that the count exceeds a threshold; and
   inserting, by the database system, the third key-level lock request in the record chain behind the key-level lock request responsive to the count exceeding the threshold, even though the third key-level lock request would otherwise be inserted in the record chain ahead of the key-level lock request.

2. The method of claim 1, further comprising subsequently granting the key-level lock request by the database system, wherein the key-level lock request remains in a same memory location in a memory buffer that stores the record chain in the database system subsequent to the granting.

3. The method of claim 2, wherein the key-level lock request remains in a same position within the record chain subsequent to the granting.

4. The method of claim 1, wherein the lock type is exclusive and the second lock type is shared.

5. The method as recited in claim 2 further comprising placing, by the database system, the key-level lock request in a granted state in the record chain in response to granting the key-level lock request.

6. A non-transitory computer-readable medium having computer instructions stored thereon that are capable of being executed by a computer system to cause operations comprising:

receiving a key-level lock request corresponding to a key in a database maintained by the computer system;

allocating a memory location to store data associated with the key-level lock request;

inserting the key-level lock request in a record chain for the key;

determining whether a lock type associated with the key-level lock request is in conflict with one or more lock types associated with other records in the record chain, wherein a conflict occurs between the key-level lock request and a given record in the record chain responsive to the lock types and further responsive to: the given record corresponding to a previously-received key-level lock request for the key, the previously-received key-level lock request having been granted, and the previously-received key-level lock request being incomplete;

delaying a grant of the key-level lock request responsive to determining that there is a conflict, wherein the delaying includes communicating the delay of the grant to a lock manager that manages locks and transactions, wherein the key-level lock request is inserted in the record chain prior to the granting the key-level lock request when the grant is delayed, and the key-level lock request waits in the record chain for the conflict to be resolved and remains in the record chain after the conflict is resolved, and wherein the previously-received key-level lock request remains in the given record in the record chain after the conflict is resolved, and wherein inserting the key-level lock request into the record chain includes linking the memory location into the record chain, wherein the delaying comprises placing the key-level lock request in a pending state in the record chain in response to determining the conflict;

receiving a second key-level lock request having a second lock type during a time that the key-level lock request is in the pending state;

inserting the second key-level lock request in the record chain ahead of the key-level lock request responsive to the lock type and the second lock type;

incrementing a count maintained with respect to the key-level lock request, wherein the incrementing is responsive to inserting the second key-level lock request ahead of the key-level lock request;

receiving a third key-level lock request having a third lock type during the time that the key-level lock request is in the pending state;

determining that the third key-level lock request would be inserted in the record chain ahead of the key-level lock request responsive to the lock type and the third lock type;

determining that the count exceeds a threshold; and inserting the third key-level lock request in the record chain behind the key-level lock request responsive to the count exceeding the threshold, even though the third key-level lock request would otherwise be inserted in the record chain ahead of the key-level lock request.

7. The non-transitory computer-readable medium of claim 6, wherein the operations further comprise subsequently granting the key-level lock request, wherein the key-level lock request remains in a same memory location in the computer system subsequent to the granting; and placing the key-level lock request in a granted state in the record chain in response to granting the key-level lock request.

8. The non-transitory computer-readable medium of claim 7, wherein the key-level lock request remains in a same position within the record chain subsequent to the granting.

9. The non-transitory computer-readable medium of claim 6, wherein the lock type is exclusive and the second lock type is shared.

10. A computer system comprising:

at least one processor; and a memory system coupled to the processor, the memory system storing computer instructions during use that are capable of being executed by the processor to cause operations comprising:

receiving a key-level lock request corresponding to a key in a database maintained by the computer system;

allocating a memory location to store data associated with the key-level lock request;

inserting the key-level lock request in a record chain for the key, wherein inserting the key-level lock request into the record chain includes linking the memory location into the record chain;

determining whether a lock type associated with the key-level lock request is in conflict with one or more lock types associated with other records in the record chain, wherein the other records in the record chain correspond to previously-received key-level lock requests for the key, and wherein a conflict is detected with a given previously-received lock request responsive to the lock types and further responsive to the given previously-received lock request having been granted but not completed;

delaying a grant of the key-level lock request responsive to determining that there is a conflict, wherein the delaying includes communicating the delay of the grant to a lock manager that manages locks and transactions, wherein the key-level lock request is inserted in the record chain prior to the granting the key-level lock request when the grant is delayed and the key-level lock request waits in the record chain for the conflict to be resolved, wherein the delaying comprises placing the key-level lock request in a pending state in the record chain in response to determining the conflict;

granting the key-level lock request in response to the conflict being resolved;

maintaining the key-level lock request and the given previously-received lock request in the record chain subsequent to the granting;

receiving a second key-level lock request having a second lock type during a time that the key-level lock request is in the pending state;

inserting the second key-level lock request in the record chain ahead of the key-level lock request responsive to the lock type and the second lock type;

incrementing a count maintained with respect to the key-level lock request, wherein the incrementing is responsive to inserting the second key-level lock request ahead of the key-level lock request;
receiving a third key-level lock request having a third lock type during the time that the key-level lock request is in the pending state;
determining that the third key-level lock request would be inserted in the record chain ahead of the key-level lock request responsive to the lock type and the third lock type;
determining that the count exceeds a threshold; and
inserting the third key-level lock request in the record chain behind the key-level lock request responsive to the count exceeding the threshold, even though the third key-level lock request would otherwise be inserted in the record chain ahead of the key-level lock request.

11. The method as recited in claim 5 further comprising:
committing the transaction that corresponds to the key-level lock request; and
placing, by the database system, the key-level lock request in a committed state in the record chain in response to committing the transaction.

\* \* \* \* \*